(12) United States Patent
Lefley (10) Patent No.: US 8,934,836 B2
(45) Date of Patent: Jan. 13, 2015

(54) NFC DEVICE WITH PLL CONTROLLED ACTIVE LOAD MODULATION

(75) Inventor: Alastair Lefley, Kemble (GB)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 13/535,874

(22) Filed: Jun. 28, 2012

(65) Prior Publication Data

US 2014/0003548 A1    Jan. 2, 2014

(51) Int. Cl.
*H04B 7/00*    (2006.01)

(52) U.S. Cl.
USPC ...... 455/41.1; 455/180.3; 455/41.2; 340/10.1

(58) Field of Classification Search
CPC .... H04B 5/00; H04B 5/0056; H04M 2250/04
USPC ........ 455/41.1, 41.2, 180.3; 375/256; 178/43; 340/10.1
See application file for complete search history.

(56) References Cited

U.S. PATENT DOCUMENTS

| | | | | |
|---|---|---|---|---|
| 6,321,067 | B1 * | 11/2001 | Suga et al. | 455/41.2 |
| 8,395,485 | B2 * | 3/2013 | Wuidart | 340/10.4 |
| 8,432,070 | B2 * | 4/2013 | Cook et al. | 307/150 |
| 8,450,877 | B2 * | 5/2013 | Baarman et al. | 307/104 |
| 2009/0040022 | A1 | 2/2009 | Finkenzeller | |
| 2012/0071089 | A1 | 3/2012 | Charrat et al. | |

FOREIGN PATENT DOCUMENTS

WO    WO 2009/063214 A1    5/2009

OTHER PUBLICATIONS

European Search Report directed to related European Patent Application No. EP2013/0003064, mailed on Oct. 10, 2014; 3 pages.
European Search Report directed to related European Patent Application No. EP2013/0003064, mailed on Oct. 30, 2014; 15 pages.

* cited by examiner

*Primary Examiner* — Sonny Trinh
(74) *Attorney, Agent, or Firm* — Sterne, Kessler, Goldstein & Fox P.L.L.C.

(57) ABSTRACT

A wireless communication device for communicating in the near-field via active load modulation. The device including an antenna configured to receive a magnetic field, a recovery device configured to recover a clock from the magnetic field, and a multiplexer configured to receive the recovered clock and a reference clock, and to output one of the recovered clock and the reference clock based on a current operational state of the wireless communication device, The wireless communication device further including a shunt regulator configured to produce the active load modulation by modulating an impedance of the wireless communication device, a phase-locked loop (PLL) configured to receive one of the recovered clock and the reference clock and to utilize the received clock to control the active load modulation, and a driver configured to contribute to the active load modulation by adjusting an amplitude of a voltage across the antenna.

20 Claims, 6 Drawing Sheets

NFC DEVICE WITH PLL CONTROLLED ACTIVE LOAD MODULATION

FIELD OF THE INVENTION

The disclosure generally relates to near field communications (NFC), and more specifically to an NFC device for performing active load modulation controlled using a phase-locked loop (PLL).

BACKGROUND

Related Art

Near field communication (NFC) devices are being integrated into communication devices, such as mobile devices to provide an example, to facilitate the use of these communication devices in conducting daily transactions. For example, instead of carrying numerous credit cards, the credit information provided by these credit cards could be stored onto an NFC device. The NFC device is simply tapped to a credit card terminal to relay the credit information to the terminal to complete a transaction. As another example, a ticket writing system, such as those used in a bus or train terminal, may simply write ticket fare information onto the NFC device instead of providing a ticket to a passenger. The passenger simply taps the NFC device to a reader to ride the bus or the train without the use of a paper ticket.

Generally, NFC requires that NFC devices be present within a relatively small distance from one another so that their corresponding magnetic fields can exchange information. Typically, a first NFC device transmits or generates a magnetic field modulated with the information, such as the credit information or the ticket fare information. This magnetic field inductively couples the information onto a second NFC device that is proximate to the first NFC device, which is received by an antenna of the second NFC device. The second NFC device may respond to the first NFC device by inductively coupling its corresponding information onto an antenna of the first NFC device.

However, in the field of NFC there is an increasing diversity of products, specifically in terms of the effective area of antennas. In particular, there is strong demand for solutions using ever smaller antennas. Therefore, NFC devices are being implemented having increasingly small antennas, despite a common desire to interoperate with legacy devices, which generally have larger antennas, and to pass test specifications defined with these larger antennas.

The disparity in antenna size generally results in poor magnetic coupling between the small and large antennas, which inhibits the ability to pass energy from one antenna to the other. This problem of energy transfer is compounded at low magnetic fields when the device with the small antenna is attempting to transmit using load modulation.

Additionally, a voltage associated with a response signal may vary depending on the distance between the first and second NFC devices, which in turns varies the magnetic coupling between these NFC devices. A large distance between the devices generally causes the received response signal to have a small voltage, and thus a poor magnetic coupling may result between the devices.

Several problems generally arise when NFC devices experience poor magnetic coupling. For example, when only a small portion of energy transmitted from the first NFC device is actually received by the second NFC device, it becomes difficult for the second NFC device to be able to power itself from the magnetic field. Further, poor magnetic coupling may inhibit the NFC devices' ability to perform load modulation because the second NFC device may only be able to effect a small portion of the total energy that was actually transmitted by the first NFC device. Thus, the net effective energy recognized back the first NFC device may be relatively small.

Thus, a need exists for NFC devices that are capable of communicating with one another even in the presence of poor magnetic coupling.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of near field communication (NFC), those skilled in the relevant art(s) will recognize that the present disclosure may be applicable to other communications that use the near field and/or the far field without departing from the spirit and scope of the present disclosure. For example, although the present disclosure is to be described using NFC capable communication devices, those skilled in the relevant art(s) will recognize that functions of these NFC capable communication devices may be applicable to other communications devices that use the near field and/or the far field without departing from the spirit and scope of the present disclosure.

An Exemplary Near Field Communications (NFC) Environment

Figure 1:
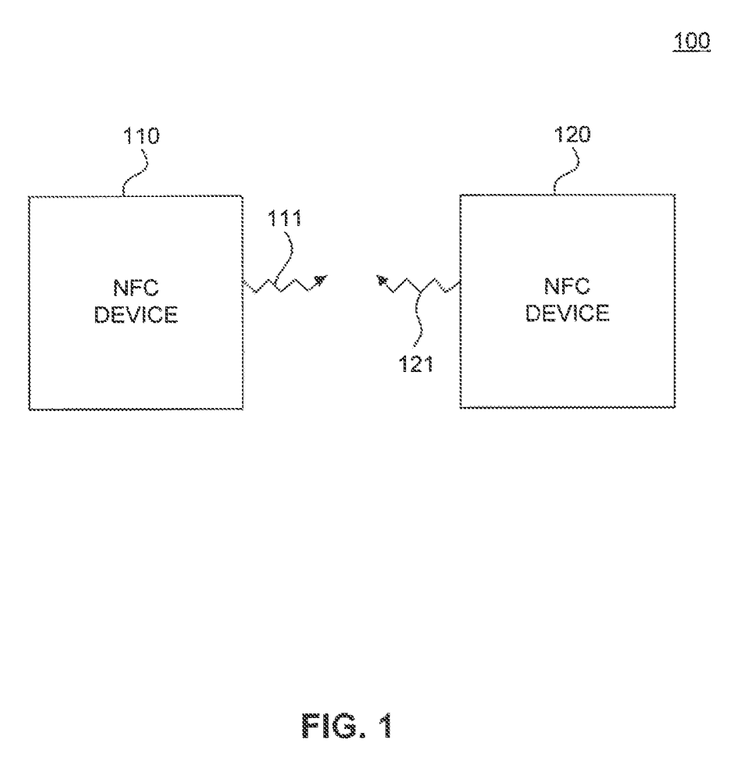
FIG. 1 illustrates a block diagram of an NFC environment according to an exemplary embodiment of the disclosure.

FIG. 1 illustrates a block diagram of an NFC environment according to an exemplary embodiment of the disclosure. An NFC environment 100 provides wireless communication of information, such as one or more commands and/or data, among a first NFC device 110 and a second NFC device 120 that are sufficiently proximate to each other. The first NFC device 110 and/or the second NFC device 120 may be implemented as a standalone or a discrete device or may be incorporated within or coupled to another electrical device or host device, such as a mobile telephone, a portable computing device, another computing device such as a personal digital assistant, a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure.

The first NFC device 110 and the second NFC device 120 interact with each other to exchange the information, in a peer-to-peer (P2P) communication mode or a reader/writer (R/W) communication mode. In the P2P communication mode, the first NFC device 110 and the second NFC device 120 may be configured to operate according to an active communication mode and/or a passive communication mode. The first NFC device 110 modulates its corresponding information onto a first carrier wave, referred to as a modulated information communication, and generates a first magnetic field by applying the modulated information communication to the first antenna to provide a first information communication 111. The first NFC device 110 ceases to generate the first magnetic field after transferring its corresponding information to the second NFC device 120 in the active communication mode. Alternatively, in the passive communication mode, the first NFC device 110 continues to apply the first carrier wave without its corresponding information, referred to as an unmodulated information communication, to continue to provide the first information communication 111 once the information has been transferred to the second NFC device 120.

The first NFC device 110 is sufficiently proximate to the second NFC device 120 such that the first information communication 111 is inductively coupled onto a second antenna of the second NFC device 120. The second NFC device 120 demodulates the first information communication 111 to recover the information. The second NFC device 120 may respond to the information by modulating its corresponding information onto a second carrier wave and generating a second magnetic field by applying this modulated information communication to the second antenna to provide a second information communication 121 in the active communication mode. Alternatively, the second NFC device 120 may respond to the information by modulating the second antenna with its corresponding information to modulate the first carrier wave to provide the second information communication 121 in the passive communication mode.

In the R/W communication mode, the first NFC device 110 is configured to operate in an initiator, or reader, mode of operation and the second NFC device 120 is configured to operate in a target, or tag, mode of operation. However, this example is not limiting. Those skilled in the relevant art(s) will recognize that the first NFC device 110 may be configured to operate in the tag mode and the second NFC device 120 may be configured to operate in the reader mode in accordance with the teachings herein without departing from the spirit and scope of the present disclosure. The first NFC device 110 modulates its corresponding information onto the first carrier wave and generates the first magnetic field by applying the modulated information communication to the first antenna to provide the first information communication 111. The first NFC device 110 continues to apply the first carrier wave without its corresponding information to continue to provide the first information communication 111 once the information has been transferred to the second NFC device 120. The first NFC device 110 is sufficiently proximate to the second NFC device 120 such that the first information communication 111 is inductively coupled onto a second antenna of the second NFC device 120.

The second NFC device 120 derives or harvests power from the first information communication 111 to recover and/or process the received information, and/or to provide a response to the information. The second NFC device 120 demodulates the first information communication 111 to recover and/or to process the information. The second NFC device 120 may respond to the information by modulating the second antenna with its corresponding information to modulate the first carrier wave to provide the second information communication 121.

Further operations of the first NFC device 110 and/or the second NFC device 120 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

An Exemplary Initiator NFC Device and Target NFC Device

Figure 2A:
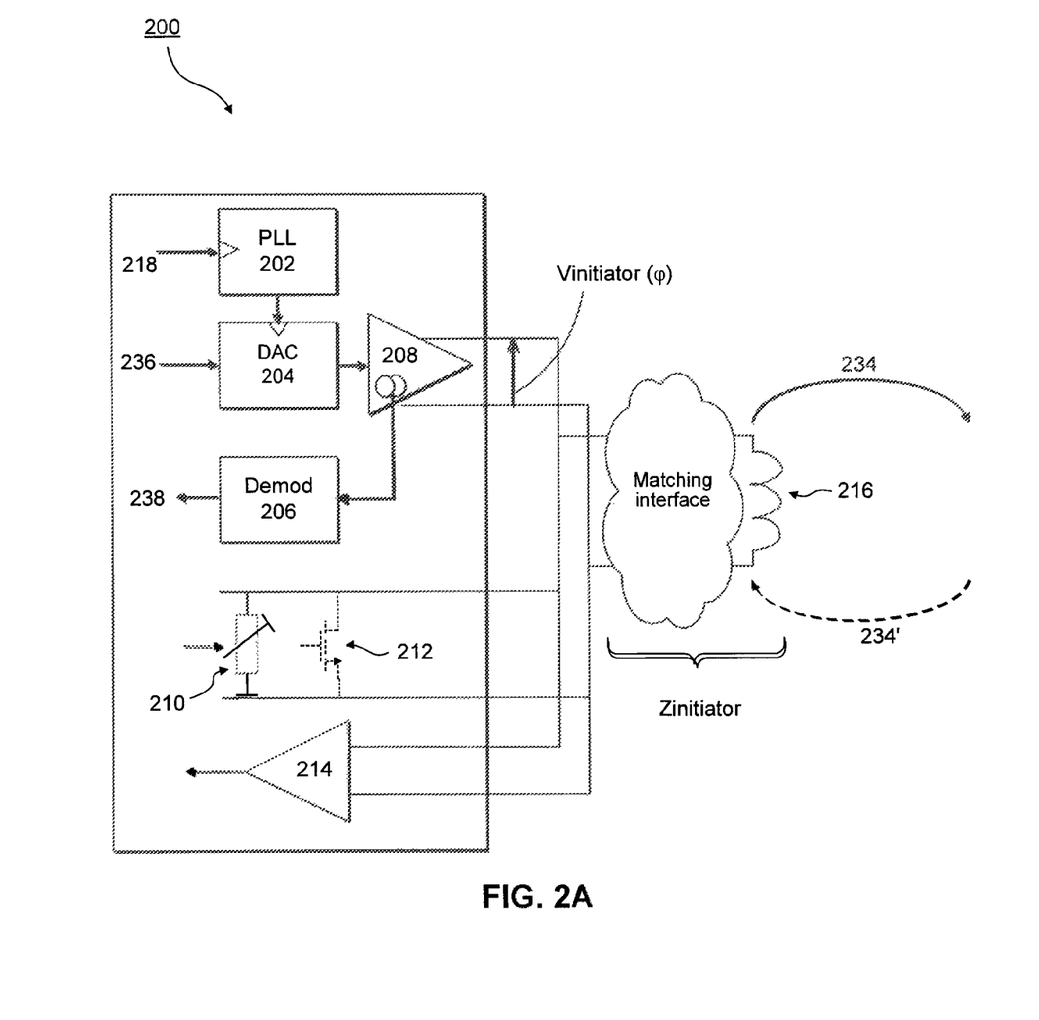
FIG. 2A illustrates a block diagram of an initiator NFC device that is implemented as part of the NFC environment according to an exemplary embodiment of the disclosure.
Figure 2B:
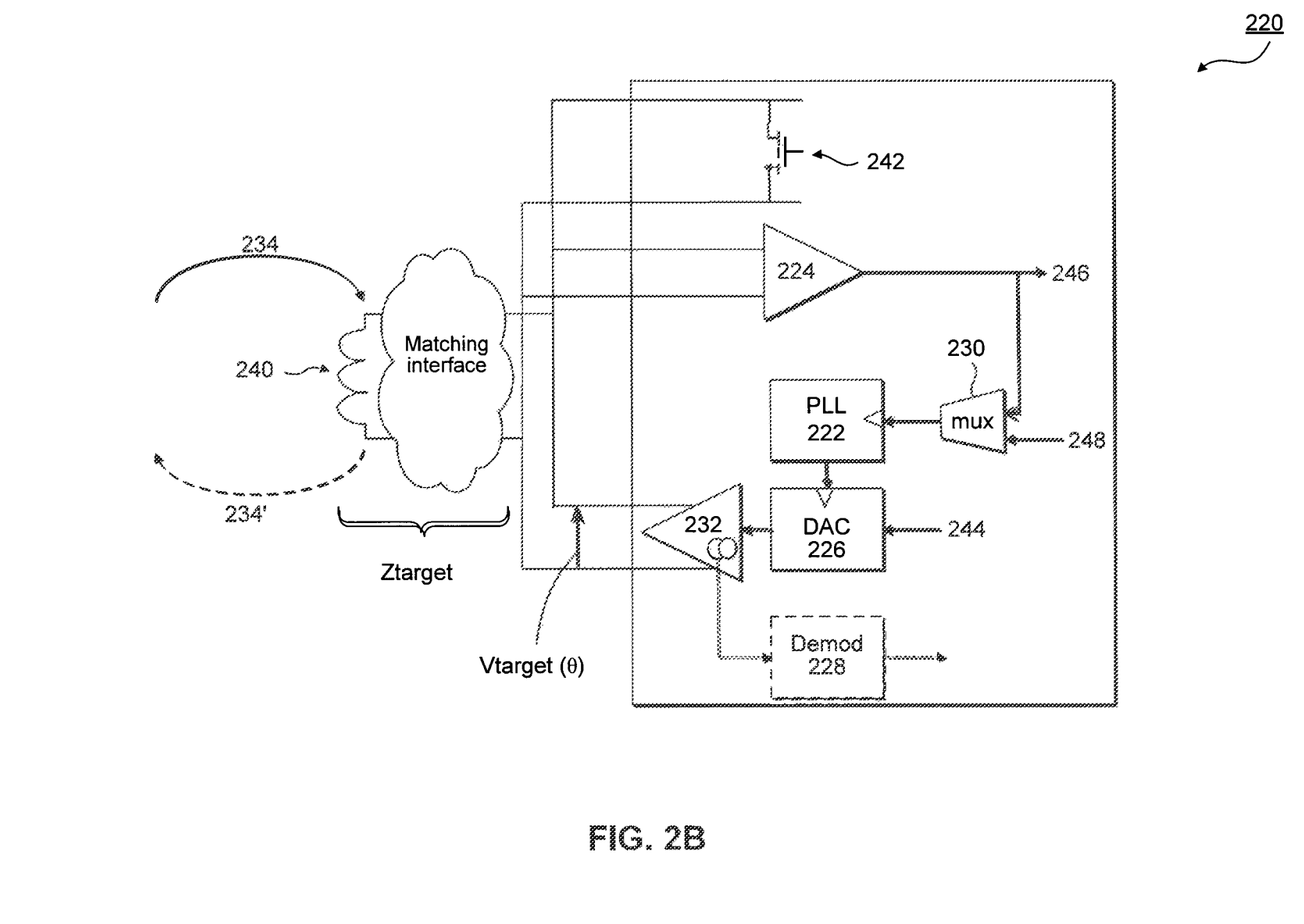
FIG. 2B illustrates a block diagram of a target NFC device that is implemented as part of the NFC environment according to an exemplary embodiment of the disclosure.

FIG. 2A illustrates a block diagram of an Initiator NFC device 200 that is implemented as part of the NFC environment 100 according to an exemplary embodiment of the disclosure. FIG. 2B illustrates a block diagram of a Target NFC device 220 that is implemented as part of the NFC environment 100 according to an exemplary embodiment of the disclosure. Initiator NFC device 200 and Target NFC device 220 may represent exemplary embodiments of first NFC device 110 and second NFC device 120, respectively.

Initiator NFC device 200, shown in FIG. 2A, and Target NFC device 220, shown in FIG. 2B, may be NFC peers. NFC is an asymmetric interface, which means that one of the NFC devices will always be tasked with creating a magnetic field 234, and the other NFC device will always be configured to receive magnetic field 234. However, when the NFC devices are manufactured, it is undefined as to which NFC device will perform which function. Therefore, Initiator NFC device 200 and Target NFC device 220 may each have dual functionality (e.g. the ability to function both as an initiator NFC and a target NFC). In FIG. 2A, Initiator NFC device 200 is functioning as an initiator, and thus Initiator NFC device 200's target circuitry (load modulator resistor 210, shunt regulator 212 and recovery device 214) is inactive and is thus shown having dashed lines. Similarly, in FIG. 2B, Target NFC device 220 is functioning as a target, and thus Target NFC device 220's initiator circuitry (demodulator 228) is assumed to be high impedance and is thus shown having dashed lines as well.

As discussed above, several factors can potentially lead to a poor magnetic coupling between Initiator NFC device 200 and Target NFC device 220 (e.g. a disparity in a size of each NFC devices' antenna and/or a relatively large distance between the antennas), which may inhibit the ability to pass energy between Initiator NFC device 200 and Target NFC device 220. This problem of energy transfer may be most severe at low magnetic fields when one of the NFC devices is attempting to transmit using load modulation (e.g. Target NFC device 220 is attempting to vary the energy being transmitted), as discussed below.

To produce a coupling between Initiator NFC device 200 and Target NFC device 220, Initiator NFC device 200 (or Target NFC device 220) passes an alternating current through an antenna 216 (or an antenna 240). This results in an alternating magnetic field 234 (or magnetic field 234'). When Target NFC device 220 (or Initiator NFC 200) is placed within the alternating magnetic field 234 (or magnetic field 234'), an alternating voltage will appear across antenna 240 (or antenna 216). This voltage may then be rectified and coupled to shunt regulator 242 (or shunt regulator 212) such that a reservoir of charge accumulates, which Target NFC device 220 (or Initiator NFC device 200) can then use to perform load modulation. In particular, load modulation is achieved by modulating the impedance of Target NFC device 220 (or Initiator NFC device 200) as seen by the Initiator NFC device 200 (or Target NFC device 220). In some embodiments, load modulation may be performed by allowing shunt regulator 242 (or shunt regulator 212) to actively modulate the impedance of Target NFC device 220 (or Initiator NFC device 200).

In an embodiment, successful communication between the NFC devices is achieved via load modulation, as Target. NFC device 220 (or Initiator NFC device 200) may send data back to the Initiator NFC device 200 (or the Target NFC device 220) using a desired load modulation technique. Communication between the NFC devices via load modulation may be achieved because current that may be drawn from antenna 240 (or antenna 216) will give rise to its own relatively small magnetic field, which will oppose the Initiator NFC device 200's (or Target NFC device 220's) field. Antenna 216 (or an antenna 240) may detect this small change in the magnetic field as a relatively small increase or decrease in the current flowing through antenna 216 (or an antenna 240), which is detected by the demodulator circuits 206 (or demodulator circuit 228). This current will then be proportional to the load applied to the antenna 240 (or antenna 216). In embodiments, initiator NFC device 200 and Target NFC device 220 are each configured to communicate using load modulation, even in the presence of a poor magnetic field.

Initiator NFC device 200's initiator circuitry includes a phase-locked loop (PLL) 202, a digital-to-analog converter (DAC) 204, a demodulator 206, a driver 208 and an antenna 216 (e.g. an inductor).

PLL 202 is configured to receive a reference clock 218, and to output a signal to DAC 204. In some embodiments, PLL 202 may be implemented as an electronic circuit, consisting of a variable frequency oscillator and a phase detector, among other functionality. PLL 202 will be discussed in greater detail below, with reference to FIG. 4.

DAC 204 is configured to perform digital-to-analog conversions of initiator transmission signal 236 and the signal received from PLL 202, such that the resulting analog signal may be filtered and driven using driver 208. In some embodiments, initiator transmission signal 236 may represent a sinusoidal or square wave in the form digital bits, and the analog signal output from DAC 204 may be a modulated sinusoidal wave represented in the analog domain. Thus, driver 208 may be a modulated sinusoidal driver, and/or variable gain amplifier.

During the reception of load modulation at Initiator NFC device 200, Initiator NFC device 200 is configured to drive antenna 216 to create magnetic field 234. In particular, Initiator NFC device 200 may synthesize the sine wave using PLL 202 and DAC 204, prior to the sine wave being fed into driver 208. Driver 208 may then filter and drive the sine wave on antenna 216.

After the sine wave is output from driver 208, the sine wave may then represent an initiator voltage ($V_{initiator}(\phi)$). The sine wave then travels through a matching interface before reaching antenna 216, where the sine wave appears as a voltage ($V_{initiator}(\phi)$) across antenna 216's pins. Therefore, the sine wave is configured to create a current flow through antenna 216, which will then translate into magnetic field 234.

As discussed above, load modulation may be achieved by modulating an impedance of Target NFC device 220 ($Z_{Target}$) as seen by Initiator NFC device 200, and that load modulation may be performed by allowing shunt regulator 242 to actively modulate $Z_{Target}$. Thus, when the NFC devices communicate using load modulation, demodulator 206 may be configured to demodulate changes in the current through antenna 216, which may be caused by shunt regulator 242's active modulation of $Z_{Target}$. Demodulator 206 is also configured to output an initiator receipt signal 238 form Initiator NFC device 200, which represents the impedance changes caused by Target NFC device 220.

Following the transmission of magnetic field 234 from antenna 216, magnetic field 234 may be received at an antenna 240 located on Target NFC device 220. This received magnetic field 234 may then induce a corresponding voltage across antenna 240. This voltage then travels through another matching interface before being processed by Target NFC device 220's target circuitry. The transmission of magnetic field 234 from Initiator NFC device 200 and the reception of magnetic field 234 by Target NFC device 220 may form a transformer. For example, depending on the amount of coupling, Initiator NFC device 200 and Target NFC device 220 may form a transformer having varying degrees of coupling therebetween.

Similar to Initiator NFC device 200, Target NFC device 220's target circuitry includes a phase-locked loop (PLL) 222, a digital-to-analog converter (DAC) 226, a driver 232 and an antenna 240. Target NFC device 220's target circuitry also includes a recovery device 224, a shunt regulator 242 and a multiplexer (MUX) 230. PLL 222, DAC 226 and driver 232 may be configured to function substantially similar to PLL 202, DAC 204 and driver 208, respectively. For example, DAC 226 is configured to perform digital-to-analog conversions of initiator/target transmission signal 244 as well as a signal output from PLL 222, such that the resulting analog signal may be filtered and driven using driver 232. In some embodiments, initiator/target transmission signal 244 may represent a sinusoidal or square wave in the form digital bits, and the analog signal output from DAC 226 may be a modulated sinusoidal wave represented in the analog domain. Thus, driver 232 may be a modulated sinusoidal wave, and/or variable gain amplifier. The functionality of PLL 222 will also be discussed in greater detail below, with reference to FIG. 4.

In some embodiments, implementing driver 232 within Target NFC device 220 may allow some conventional functionality to be omitted from Target NFC device 220. For example, by reusing driver 232 to aid in the modulation and demodulation of magnetic field 234, Target NFC device 220 may be implemented without a variable resistor, load modulation resistor, or other load-modulator device. Additionally, driver 232 may also function as an amplifier, and may be configured to actively drive energy towards magnetic field 234.

As discussed above, shunt regulator 242 may be configured to actively modulate $Z_{Target}$ such that load modulation may be performed. Additionally, shunt regulator 242 may be configured to maintain a safe voltage level within Target NFC device 220. For example, shunt regulator 242 may be configured to vary its resistance in accordance with a load associated with Target NFC device 220, which may allow Target NFC device 220 to derive a voltage ($V_{target}(\theta)$). In some embodiments, when performing passive load modulation using shunt regulator 242, $V_{target}(\theta)$ may be transformed from $V_{initiator}(\phi)$, and thus $V_{target}(\theta)$ will be derived. This result may be different when using active load modulation, as $V_{target}(\theta)$ is being output (not derived) when using active load modulation. Additionally, in some embodiments, shunt regulator 242 may be static during periods of active communication between Initiator NFC device 200 and Target NFC device 220. Additionally, shunt regulator 242 may be a metal-oxide-semiconductor field-effect transistor (MOSFET). Shunt regulator 242 may also include a clamp.

Recovery device 224 is configured to recover a clock (e.g. a Target recovered clock 246) from magnetic field 234 when magnetic field 234 is received at antenna 240, and then output Target recovered clock 246 to MUX 230. Recovery device 224 may also be configured to output Target recovered clock 246 such that Target recovered clock 246 is output from Target NFC Device 220. In some embodiments, recovery device 224 may be a differential signal comparator. Additionally, Target NFC device 220 may also include a rectifier (not shown in FIG. 2B), which may be configured to provide an indication of a peak voltage level of the incoming signal $V_{target}(\theta)$. This peak level has a reference level subtracted from it which, as an error amplifier function, controls how strongly shunt regulator 242 turns on.

MUX 230 is configured to receive Target recovered clock 246, as well as a reference clock 248. MUX 230 is also configured to select either Target recovered clock 246 or reference clock 248 depending on a current operational state of Target NFC device 220, and then output the selected clock (e.g. either Target recovered clock 246 or reference clock 248) to PLL 222.

In some embodiments, Initiator NFC device 200 and Target NFC device 220 may be configured to operate in the reverse direction. For example, Target NFC device 220 may be configured to transmit a magnetic field back 234' back to Initiator NFC device 200. Target NFC device 220 may do so by using modulation signal 244 to modulate the sine wave produced by PLL 222 and DAC 226, before driving using driver 232.

Initiator NFC device 200 may be configured to demodulate the magnetic field 234', received from Target NFC device 220, according to multiple different techniques. For example, Initiator NFC device 200 may include current sensing functionality. In particular, if Initiator NFC device 200 provides a voltage ($V_{initiator}(\phi)$) having a substantially constant amplitude, then the driver current ($I_D$)=$V_{initiator}(\phi)$/(Load_Resistance). Therefore, if the Load_Resistance changes, a corresponding change in the driver current ($I_D$) may be detected by Initiator NFC device 200. In an embodiment, driver 208 may be a linear driver, in which case, the driver current ($I_D$) may be reproduced and fed back into demodulator 206. Therefore, by including this current sensing functionality within Initiator NFC device 200, the number of pins feeding into antenna 216 may be reduced (e.g. from six pins to two pins), and the number of external components may also be reduced.

In some embodiments, Initiator NFC device 200 and Target NFC device 220 may be configured to perform load modulation in the presence of a high magnetic field where a strong coupling may exist, as well as in the presence of a low magnetic field, as discussed above.

When a high magnetic field exists, the voltage at antenna 240 may continuously build up and may ultimately become too high. Therefore, shunt regulator 242 may be configured to load the pins of antenna 240 through a feedback mechanism until the voltage across antenna 240 reaches a safe level. To maintain a safe voltage level across antenna 240, Target NFC device 220 is configured to first measure the voltage at each of the pins of antenna 240. For example, the pins of antenna 240 may either be rectified or envelope detected to measure the voltage across antenna 240. Depending on the measured voltage across antenna 240, shunt regulator 242 is then configured to shunt a corresponding current between the pins of antenna 240 until the voltage across the pins of antenna 240 reaches a safe level.

In an exemplary embodiment, Initiator NFC device 200 and Target NFC device 220 may be replaced with an Initiator radio frequency identification (RFID) device and a Target RFID device. The Initiator RFID device and the Target RFID device may be configured to function substantially similar to Initiator NFC device 200 and Target NFC device 220; however, the RFID devices may not include dual functionality. For example, the Initiator RFID device may only include initiator circuitry, and the Target RFID device may only include target circuitry.

An Exemplary Modulation Vector

Figure 3:
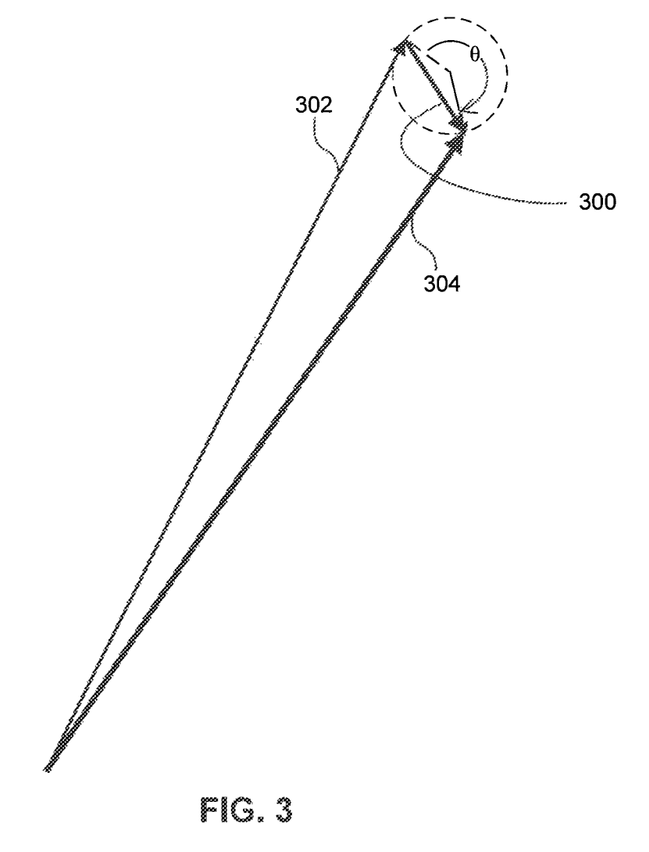
FIG. 3 illustrates a graphical representation of a modulation vector that is subject to active load modulation according to an exemplary embodiment of the present disclosure.

FIG. 3 illustrates a graphical representation of a modulation vector 300 that is subject to active load modulation according to an exemplary embodiment of the present disclosure.

As discussed above, Initiator NFC device 200 may be configured to transmit a modulated magnetic field 234, and upon receipt of the modulated magnetic field 234, by Target NFC device 220, Target NFC device 220 may be configured to demodulate magnetic field 234, and/or transmit modulated magnetic field 234' back to Initiator NFC device 200.

In an embodiment, Initiator NFC device 200 may be configured to perform demodulation of magnetic field 234' by demodulating modulation vector 300. Modulation vector 300 represents the offset between an unmodulated Initiator output current (unmodulated current) 302 and a modulated Initiator output current (modulated current) 304. Unmodulated current 302 represents both the amplitude and phase of the current output from Initiator NFC device 200 when Target NFC device 220 is not performing load modulation. Conversely, modulated current 304 represents both the amplitude and phase of the current output from Initiator NFC device 200 when Target NFC device 220 is currently performing load modulation. In some embodiments, unmodulated current 302 may be directly proportional to unmodulated magnetic field 234, while modulated current 304 may be directly proportional to modulated magnetic field 234'.

To properly demodulate modulation vector 300, modulation vector 300's amplitude is calculated. For simplicity and illustrative purposes only, modulation vector 300's amplitude may be represented by the modulus of $V_{target}(\theta)/Z_{target}$ (e.g. Amplitude $\propto |V_{target}(\theta)/Z_{target}|$). $V_{target}(\theta)$ and $Z_{target}$ respectively represent the voltage received and impedance present at Target NFC device 220 when magnetic field 234 is transmitted by Initiator NFC device 200. This functional representation of modulation vector 300's amplitude is a simplified function where the effects of shunt regulator 242 have been temporarily ignored. Accordingly, when passively load-modulating using shunt regulator 242, $V_{target}(\theta)$ is approximately proportional to the product of $V_{initiator}(\phi)$ and the coupling between Initiator NFC device 200 and Target NFC device 220. Therefore, if the coupling between Initiator NFC device 200 and Target NFC device 220 decreases, then both $V_{target}(\theta)$ and modulation vector 300's amplitude decease as well. However, when actively load-modulating using MUX 230, PLL 222, DAC 226 and driver 232, $V_{target}(\theta)$ may be independent of the strength of magnetic field 234, the coupling between the NFC devices, and $V_{initiator}(\phi)$.

To properly transmit and receive the modulated magnetic fields 234 and 234' between Initiator NFC device 200 and Target NFC device 220, Target NFC device 200 is configured to increase the modulation vector 300's amplitude. Also, by increasing modulation vector 300's amplitude, Target NFC device 220 may satisfy a wide range of communication standards on load modulation, including but not limited to, ISO/IEC 18092/ECMA-340 (Near Field Communication Interface and Protocol-1 (NFCIP-1)), ISO/IEC 21481/ECMA-352 (Near Field Communication Interface and Protocol-2 (NFCIP-2)), ISO/IEC 14443, and NFC Data Exchange Format (NDEF). Additionally, or alternatively, modulation vector 300's amplitude may be increased to improve Initiator NFC device 200 and Target NFC device 220's interoperability with other devices (e.g. devices having both large and small antennas).

In some embodiments, Target NFC device 220 may be configured to increase modulation vector 300's amplitude, beyond Initiator NFC device 200's contribution, by performing active load modulation. For example, using active load modulation, Target NFC device 220 is capable of actively driving $V_{target}(\theta)$, which results in a contribution to modulation vector 300's amplitude. Target NFC device 220's contribution to modulation vector 300's amplitude was not previously possible using traditional passive modulation schemes. Additionally, or alternatively, active load modulation allows Target NFC device 220 to contribute to the drive of magnetic field 234, and thus Target NFC device 220 may have a relatively large influence on magnetic field 234. When $V_{target}(\theta)$ is being actively driven, it may have a substantial amplitude, and may not be limited to the amplitude being induced on the pins of antenna 240.

Target NFC device 220 may also be configured to actively control the phase ($\theta$) of modulation vector 300. Similar to the amplitude of modulation vector 300, the phase ($\theta$) of modulation vector 300 may also be important in terms of the proper transmission of modulated magnetic field 234. For example, if $\theta$ is set to an incorrect value, then the magnitude of modulation vector 300 could inadvertently return to zero. However, when $\theta$ is properly set, Target NFC device 220 may contribute to modulation vector 300's magnitude such that modulation vector 300 has reaches its maximum possible magnitude. In an embodiment, Target NFC device 220 is configured to actively control the phase ($\theta$) of modulation vector 300 by implementing functionality to store the angle of unmodulated current 302 (e.g. the incident unmodulated vector). Additionally, Target NFC device 220 may also be configured to drive $\theta$ at substantially the same frequency as unmodulated current 302. Therefore, Target NFC device 220 may be implemented having PLL 222 to actively control the phase and frequency of $V_{target}(\theta)$ such that the phase and frequency remain the same as the phase and frequency of unmodulated current 302 (e.g. the incident unmodulated vector).

An Exemplary Phase-Locked Loop (PLL)

Figure 4:
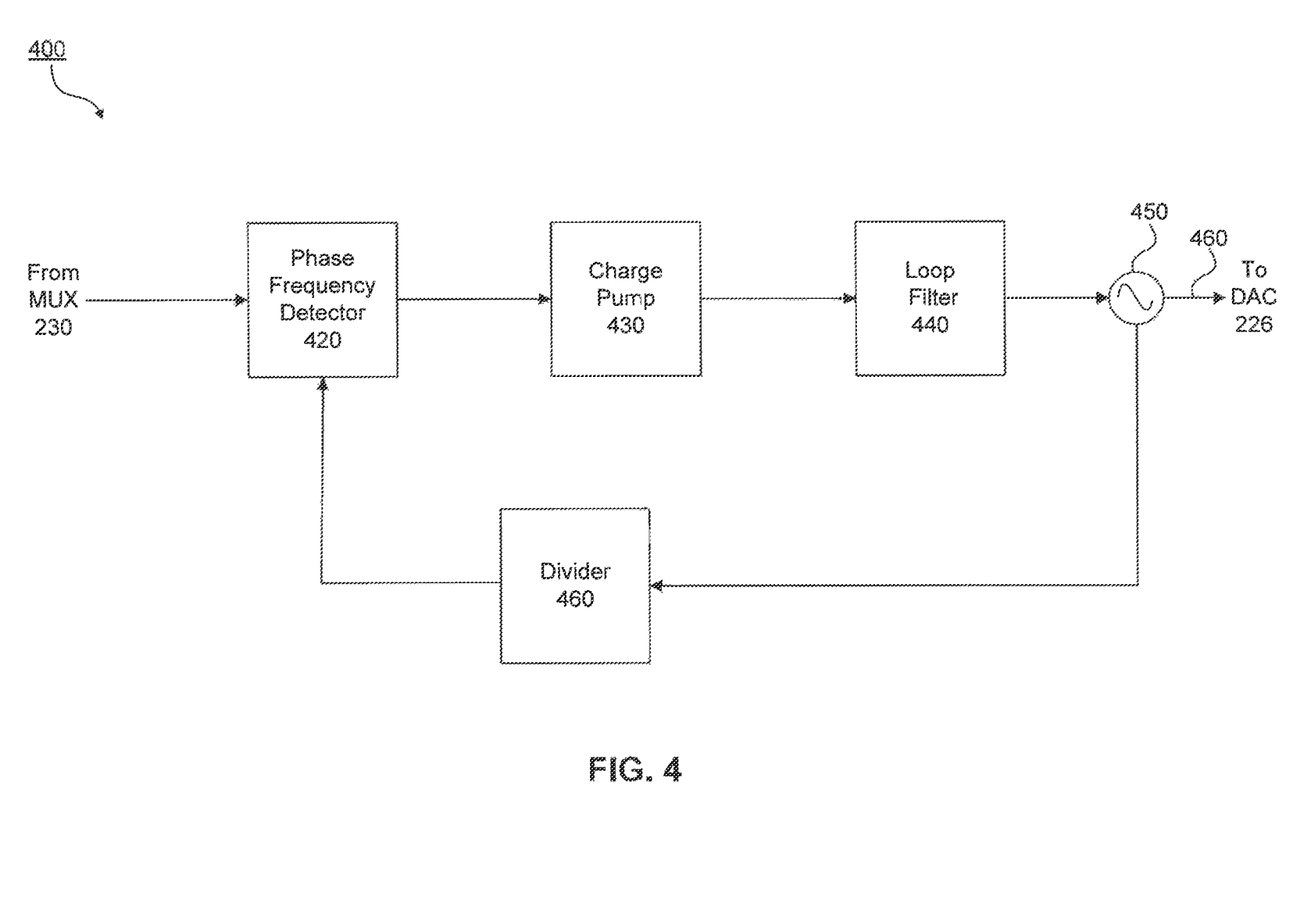
FIG. 4 illustrates a block diagram of a phase-locked loop (PLL) that may be implemented as part of the NFC devices according to an exemplary embodiment of the present disclosure.

FIG. 4 illustrates a block diagram of an exemplary phase-locked loop (PLL) 400 that may be implemented as part of Initiator NFC device 200 and/or Target NFC device 220 according to an exemplary embodiment of the present disclosure. For illustrative purposes only, PLL 400 will be described with reference to PLL 400's implementation within Target NFC device 220; however, the below description of PLL 400 may be similarly applicable to implementing PLL 400 within Initiator NFC device 200. Additionally, PLL 400 may represent an exemplary embodiment of PLL 202 and/or PLL 222.

As shown in PLL 400, a reference signal is input to a phase-frequency detector 420, from MUX 230. As discussed above, MUX 230 is configured to select, and subsequently output, either Target recovered clock 246 or reference clock 248 depending on a current operational state of Target NFC device 220. Therefore, the reference signal input to phase-frequency detector 420 may either represent Target recovered clock 246 or reference clock 248. For example, PLL 400 may input the reference clock 248 to phase-frequency detector 420 when Target NFC device 220 is acting as an initiator, and PLL 400 may input Target recovered clock 246 when Target NFC device 220 is acting as a target. For illustrative purposes only, the scenario where the reference signal represents Target recovered clock 246 will be discussed below.

Under normal operation, phase-frequency detector 420 detects the phase and frequency difference between the reference signal and the signal generated by an oscillator (e.g., voltage-controller oscillator) 450. The signal generated by oscillator 450 may represent a synthesized signal. A charge pump 430 then generates adjustment signals for adjusting the phase and frequency of oscillator 450, which are filtered by a loop filter 440 (e.g. low-pass filter) before being supplied to oscillator 450. The output of loop filter 440 may be a voltage that can be stored on a capacitor, prior to being supplied to oscillator 450. In an embodiment, this capacitor may be included within loop filter 440, and may represent a parallel capacitor. In a feedback loop that supplies the voltage-controller oscillator (VCO) 450 output to the phase-frequency detector 420, a divider 460 may be included to reduce a frequency of the oscillator signal so that it, along with the phase, may be properly compared with the reference signal by the phase-frequency detector 420.

PLL 400 may be configured to lock to Target recovered clock 246, such that PLL 400 reproduces the clock frequency and phase of the incoming magnetic field 234. Therefore, PLL 400 may lock to Target recovered clock 246 during instances where Target NFC device 220 is not transmitting load modulation. Therefore, magnetic field 234 may be stable during these instances where PLL 400 locks to Target recovered clock 246. PLL 400 may be configured to transition from this locked state to an unlocked "memory mode" between the transmission and receipt of information packets. PLL 400 may also be configured to transition from the locked state to the "memory mode" by implementing PLL 400 as an open loop prior to transmitting load modulation. For example, loop filter 440 may include a series resistor, which may be open circuited to create the open loop PLL 400. Implementing this open loop within PLL 400 may place PLL 400 into the "memory mode" such that PLL 400 remembers the state in which it was locked. Therefore, PLL 400 may continue to oscillate such that it produces a signal 460 having the same frequency and phase during transmission of load modulation as the frequency and phase that PLL 400 produced just prior to transmitting load modulation.

PLL 400 is configured to output signal 460 by disabling phase-frequency detector 420, such that the output of loop filter 440 (e.g. the voltage stored on the capacitor) is retained. Therefore, oscillator 450 may continue to operate at the same phase and frequency that it was operating at prior to phase-frequency detector 420 being disabled. It may be necessary to disable phase-frequency detector 420 during the transmission of load modulation (e.g. while driving of $V_{target}(\theta)$), because magnetic field 234 may be simultaneously changing during the transmission of load modulation. Therefore, during the transmission of load modulation, PLL 400 is configured to output signal 460 from oscillator 450 to DAC 226. In an embodiment, after signal 460 is output from oscillator 450, signal 420 may represent a sine wave. DAC 226 may then synthesize signal 460 such that signal 460 (e.g. the sine wave) may be driven by driver 232.

Therefore, PLL 400's ability to transition from locked state to the memory mode (e.g. open loop) allows it to control the phase of $V_{target}(\theta)$. In an embodiment, PLL 400 may be configured to derive a phase-delayed, a phase-early, or 180° out-of-phase version of the incoming magnetic field 234. This derived version of magnetic field 234 may then be used to control the phase of $V_{target}(\theta)$. Additionally, in some embodiments, driver 232 may be a variable gain amplifier having an electronically settable voltage gain. Here, PLL 400 may be the functional source for variable gain amplifier 232, and thus PLL 400 may be configured to determine and actively control the phase of $V_{target}(\theta)$ while other configuration settings set the voltage gain of variable gain amplifier 232. By controlling the amplitude and phase of $V_{target}(\theta)$, PLL 400 may control the amplitude of modulation vector 300. Thus, the implementation of PLL 400 allows for precise phase control between magnetic field 234 and $V_{target}(\theta)$, which in turn allows for improved signaling from Target NFC device 220 to Initiator NFC device 200 even in the presence of poor magnetic coupling.

The implementation of PLL 400 within Target NFC device 220 allows load modulation to be performed according to multiple different techniques. For example, driver 232 may be activated at instances when load modulation is desired, or driver 232 may instead be placed in an activation state at all times, where driver 232's amplitude and/or angle may be modulated when load modulation is desired. In particular, the amplitude and/or angle of $V_{target}(\theta)$ may be modulated by modulating driver 232's amplitude and/or angle. In an embodiment, by implementing PLL 400 having an open loop, driver 232's phase and frequency may be configured to match the phase and frequency of the incoming magnetic field 234 from Initiator NFC device 200.

However, when $V_{target}(\theta)$ is generated and driven (e.g. during active transmission of load modulation), unmodulated current 302 becomes modulated current 304, and modulated current 304 is then fed through recovery device 224. Therefore, by generating and driving $V_{target}(\theta)$, target recovered clock 246 changes, and thus the reference signal input into PLL 400 changes as well. Therefore, to ensure properly functionality of Target NFC device 220 during transmission of load modulation, PLL 400 is configured to be immune to changes in the phase and/or frequency of target recovered clock 246 during this transmission of load modulation.

In some embodiments, Target NFC device 220 may be implemented such that the modulated data signal may be applied directly to PLL 400's phase-frequency detector 420. This may alter the locked state of PLL 400, and may also alter PLL 400's control the over the load modulation. Additionally, or alternatively, PLL 400 may be configured to lock an oversampling controlled oscillator such that a high frequency is synthesized. The high frequency may then be used to digitally synthesize a sine wave. Conversely, PLL 400 may be designed to oscillate directly at the reference clock frequency (e.g. 13.56 MHz) and analog filtering may then be used to control the phase of $V_{target}(\theta)$.

Additionally, as discussed above, actively controlling modulation vector 300's amplitude may allow Target NFC device 220 to satisfy a wide range of communication standards on load modulation. Therefore, implementing PLL 400 within Target NFC device 220 to actively control $V_{target}(\theta)$, (allows Target NFC device 220 (and/or Initiator NFC device 200) to conform to communication standards on load modulation, including but not limited to, ISO/IEC 18092/ECMA-340 (Near Field Communication Interface and Protocol-1 (NFCIP-1)), ISO/IEC 21481/ECMA-352 (Near Field Communication Interface and Protocol-2 (NFCIP-2)), ISO/IEC 14443, and NFC Data Exchange Format (NDEF).

An affirmative indication that active load modulation is being performed may be derived from the amount of current being drawn by an NFC device. For example, when using active load-modulation, an NFC device's power supply may draw significant current. Additionally, the power supply current of the NFC device may correlate closely with the data being transmitted using active load-modulation. In some embodiments, the power supply current used by the PLL may also be monitored directly to determine whether the PLL is active or inactive.

An Exemplary Method of Performing Active Load Modulation

Figure 5:
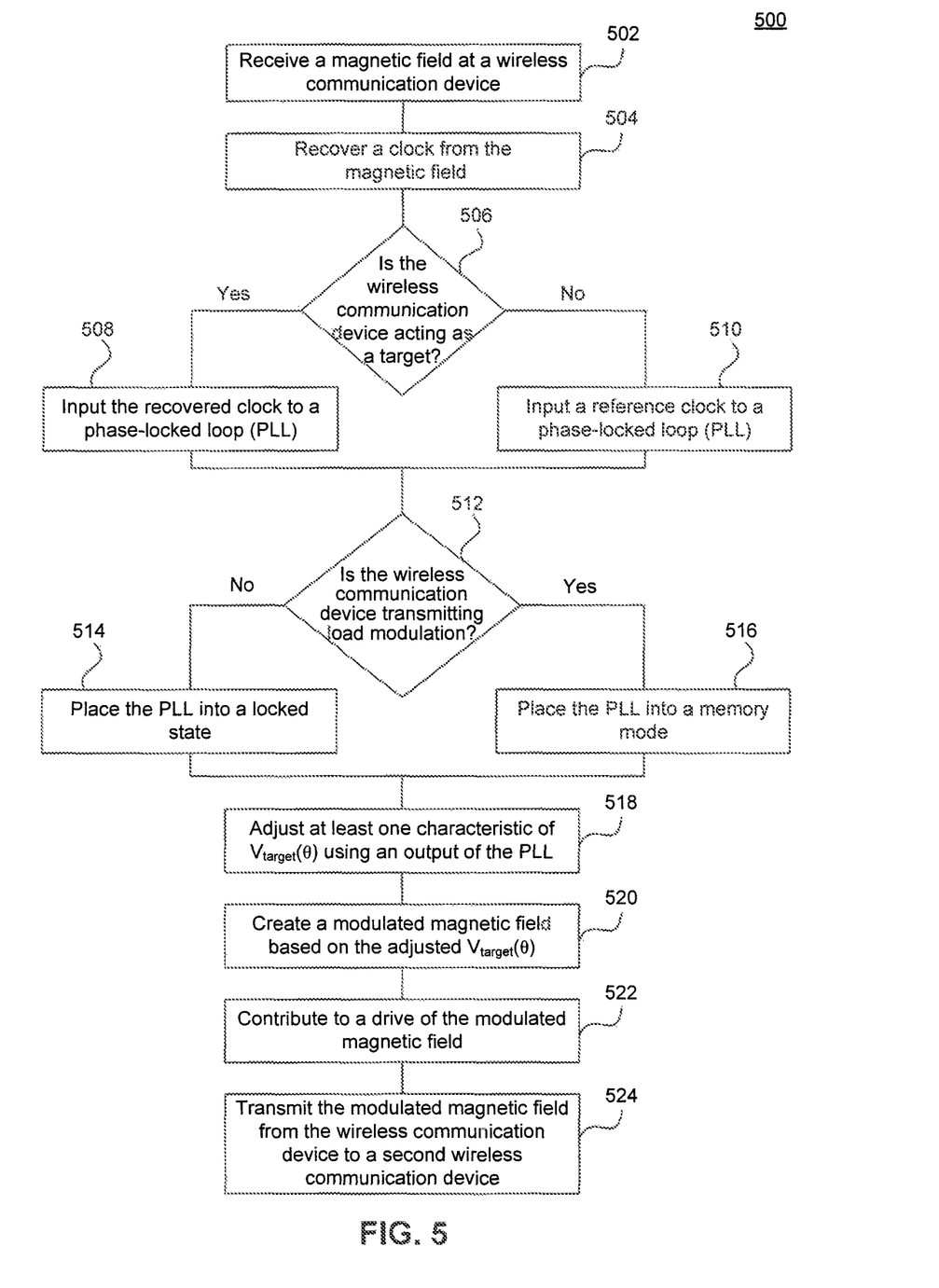
FIG. 5 is a flowchart of exemplary operational steps of performing active load modulation according to an exemplary embodiment of the present disclosure.

FIG. 5 is a flowchart of exemplary operational steps of performing active load modulation according to an exemplary embodiment of the present disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 5. The flowchart of FIG. 5 is described with reference to embodiments of FIGS. 1-4. However, a method 500 is not limited to these embodiments.

The method 500 begins at step 502, where magnetic field 234 is received at antenna 240 of Target NFC device 220.

In step 504, recovery device 224 recovers Target recovered clock 246 from magnetic field 234.

In step 506, a determination is made as to whether Target NFC device 220 is currently functioning as a target (e.g. receiving magnetic field 234 from Initiator NFC device 200) or if Target NFC device 220 is currently functioning as an initiator (e.g. transmitting modulated magnetic field 234'). If Target NFC device 220 is currently functioning as a target, then the method proceeds to step 508.

In step 508, PLL 222 is configured to receive Target recovered clock 246 from MUX 230, and to input Target recovered clock 246 into phase-frequency detector 420.

Alternatively, if it is determined at step 506 that Target NFC device 220 is currently functioning as an initiator, then the method proceeds to step 510. In step 510, PLL 222 is configured to receive reference clock 248 from MUX 230, and to input reference clock 248 into phase-frequency detector 420.

In step 512, a determination is made as to whether Target NFC device 220 is currently transmitting load modulation. As discussed above, it may be necessary to make this determination because magnetic field 234 may be simultaneously changing during the transmission of load modulation. If Target NFC device 220 is not currently transmitting load modulation, then the method proceeds to step 514.

In step 514, PLL 400 is placed into the locked state where PLL 400 locks to Target recovered clock 246, such that PLL 400 reproduces the clock frequency and phase of the incoming magnetic field 234. Therefore, magnetic field 234 may be stable during these instances where PLL 400 locks to Target recovered clock 246.

Alternatively, if it is determined at step 512 that Target NFC device 220 is currently transmitting load modulation, then the method proceeds to step 516. In step 516, PLL 400 is placed into the "memory mode" such that PLL 400 remembers the state in which it was locked. Therefore, PLL 400 may continue to oscillate such that it produces a signal 460 having the same frequency and phase during transmission of load modulation as the frequency and phase that PLL 400 produced just prior to transmitting load modulation.

As discussed above, PLL 400 may be configured to transition from the locked state to the "memory mode" between the transmission and receipt of information packets. PLL 400 may also be configured to transition from the locked state to the "memory mode" by implementing PLL 400 as an open loop prior to transmitting load modulation. For example, loop filter 440 may include a series resistor, which may be open circuited to create the open loop PLL 400.

In step 518, at least one characteristic of $V_{target}(\theta)$ is adjusted using the output of PLL 400. In particular, PLL 400's ability to operate in two different states: the locked state and the memory mode (e.g. open loop), allows it to have an effect on the phase of $V_{target}(\theta)$. In particular, PLL 400 may derive a phase-delayed, a phase-early, or 180° out-of-phase version of the incoming magnetic field 234, and this derived version of magnetic field 234 may then be used to control the phase of $V_{target}(\theta)$. Additionally, PLL 400 may be configured to operate as the functional source for driver 232 (e.g., variable gain amplifier 232), and thus PLL 400 may be configured to determine and actively control the amplitude of $V_{target}(\theta)$ by setting the voltage gain of variable gain amplifier 232.

In step 520, modulated magnetic field 234' is created based on the adjustments in the phase and amplitude of $V_{target}(\theta)$. By controlling the amplitude and phase of $V_{target}(\theta)$, PLL 400 may control the magnitude of modulation vector 300, which in turn allows for precise phase control between magnetic field 234' and $V_{target}(\theta)$.

In step 522, driver 232 contributes to the drive of magnetic field 234' by actively driving energy towards magnetic field 234'.

In step 524, modulated magnetic field 234' is transmitted from Target NFC device 220 to Initiator NFC device 200, where it may be demodulated by demodulator 206. As discussed above, PLL 400's ability to precisely control the phase between magnetic field 234' and $V_{target}(\theta)$ allows for optimum signaling from Target NFC device 220 to Initiator NFC device 200 even in the presence of poor magnetic coupling.

CONCLUSION

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A wireless communication device, comprising:
   an antenna configured to receive a magnetic field;
   a recovery device configured to recover a clock from the magnetic field;
   a multiplexer configured to receive the recovered clock and a reference clock, and to output one of the recovered clock and the reference clock based on a current operational state of the wireless communication device;
a shunt regulator configured to produce an active load modulation by actively modulating an impedance of the wireless communication device;
a phase-locked loop (PLL) configured to receive one of the recovered clock and the reference clock and to utilize the received clock to control the active load modulation; and
a driver configured to contribute to the active load modulation by adjusting an amplitude of a voltage across the antenna.

2. The wireless communication device of claim 1, wherein the wireless communication device is a target near field communication (NFC) device.

3. The wireless communication device of claim 1, wherein the shunt regulator is further configured to vary a resistance based on a load associated with the antenna.

4. The wireless communication device of claim 3, wherein the shunt regulator is further configured to increase the load using a feedback mechanism to maintain a safe voltage level on the antenna.

5. The wireless communication device of claim 1, wherein the multiplexer is configured to output the recovered clock when the current operational state of the wireless communication device is that of a target.

6. The wireless communication device of claim 1, wherein the multiplexer is configured to output the reference clock when the current operational state of the wireless communication device is that of an initiator.

7. The wireless communication device of claim 1, wherein the PLL is further configured to transition between a locked state and a memory mode between a transmission and receipt of information packets.

8. The wireless communication device of claim 7, wherein the PLL is functioning in the memory mode during transmission of the active load modulation, and is functioning in the locked state at all other times.

9. The wireless communication device of claim 1, wherein the wireless communication device is a target radio frequency identification (RFID) device.

10. A wireless communication system, comprising:
a first wireless communication device, having initiator circuitry, configured to drive a first antenna to create a first magnetic field; and
a second wireless communication device, having target circuitry, configured to receive the first magnetic field at a second antenna, to recover a clock from the first magnetic field, to perform active load modulation based on the recovered clock, and to drive the second antenna to create a second magnetic field based on the active load modulation,
wherein the target circuitry comprises a multiplexer configured to output one of the recovered clock and a reference clock based on a current operational state of the second wireless communication device, and
wherein the first wireless communication device is further configured to receive the second magnetic field and to demodulate the second magnetic field using a demodulation technique.

11. The wireless communication system of claim 10, wherein the initiator circuitry comprises:
a demodulator configured to demodulate the second magnetic field;
a first phase-locked loop (PLL) configured to synthesize a sine wave; and
a first driver configured to drive the synthesized sine wave on the first antenna to create the first magnetic field, and wherein the target circuitry comprises:
a recovery device configured to recover the clock from the second magnetic field;
a shunt regulator configured to produce the active load modulation by actively modulating an impedance of the second wireless communication device;
a second PLL configured to receive one of the recovered clock and the reference clock and to utilize the received clock to control the active load modulation; and
a second driver configured to contribute to the active load modulation by adjusting an amplitude of a voltage across the second antenna.

12. The wireless communication system of claim 11, wherein the first wireless communication device is configured to create the first magnetic field by adjusting a voltage of the sine wave.

13. The wireless communication system of claim 10, where the first wireless communication device and the second wireless communication device form a transformer.

14. The wireless communication system of claim 10, wherein the first wireless communication device is configured to demodulate the second magnetic field using current sensing functionality.

15. The wireless communication system of claim 10, wherein the first wireless communication device and the second wireless communication device are configured to communicate using active load modulation in the presence of both a high magnetic field and a low magnetic field.

16. The wireless communication system of claim 10, wherein the first wireless communication device and the second wireless communication device have poor magnetic coupling.

17. A method of performing active load modulation:
receiving a magnetic field at a wireless communication device;
recovering a clock from the magnetic field;
inputting one of the recovered clock and a reference clock to a phase-locked loop (PLL), located within the wireless communication device, based on an operational state of the wireless communication device;
placing the PLL into one of a locked state and a memory mode based on the operational state of the wireless communication device;
adjusting at least one characteristic of a voltage vector produced by the wireless communication device;
creating a modulated magnetic field based on the adjusted voltage vector; and
contributing to a drive of the modulated magnetic field.

18. The method of claim 17, wherein placing the PLL into one of a locked state and a memory mode comprises:
placing the PLL in the memory mode, by open circuiting the PLL, during a transmission of the modulated magnetic field; and
placing the PLL in the locked state at other times, such that the PLL locks to the recovered clock,
wherein the PLL is configured to remember a phase and frequency of the recovered clock while in the memory mode.

19. The method of claim 17, further comprising loading an antenna, located on the wireless communication device, through a feedback mechanism to maintain a safe voltage level across the antenna, wherein the loading is performed when the magnetic field is high.

20. The method of claim 17, further comprising:
transmitting the modulated magnetic field from the wireless communication device to a second wireless communication device; and demodulating the modulated magnetic field using current sensing functionality within the second wireless communication device.

* * * * *